United States Patent
Sågfors et al.

(10) Patent No.: US 10,631,270 B2
(45) Date of Patent: *Apr. 21, 2020

(54) METHODS AND NODES FOR SETTING VALUES OF SYSTEM PARAMETERS USED IN A WIRELESS COMMUNICATION SYSTEM

(71) Applicant: Telefonaktiebolaget LM Ericsson (publ), Stockholm (SE)

(72) Inventors: Mats Sågfors, Kyrkslätt (FI); David Astely, Bromma (SE); Stefan Parkvall, Stockholm (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,093

(22) Filed: May 4, 2017

(65) Prior Publication Data

US 2017/0303239 A1 Oct. 19, 2017

Related U.S. Application Data

(63) Continuation of application No. 13/993,474, filed as application No. PCT/EP2010/070241 on Dec. 20, 2010, now Pat. No. 9,699,765.

(51) Int. Cl.
*H04W 72/02* (2009.01)
*H04W 48/12* (2009.01)
(Continued)

(52) U.S. Cl.
CPC .......... *H04W 72/02* (2013.01); *H04W 48/12* (2013.01); *H04W 8/183* (2013.01); *H04W 28/06* (2013.01)

(58) Field of Classification Search
None
See application file for complete search history.

(56) References Cited

U.S. PATENT DOCUMENTS

| 6,628,946 B1 | 9/2003 | Wiberg et al. |
| 7,346,353 B2 | 3/2008 | Farnsworth et al. |
| (Continued) | | |

FOREIGN PATENT DOCUMENTS

| GB | 2381414 A | 4/2003 |
| WO | 0072609 A1 | 11/2000 |
| WO | 2010008844 A1 | 1/2010 |

OTHER PUBLICATIONS

Unknown, Author, "Allocation of RNTI values", Nokia Corporation, Nokia Siemens Networks, 3GPP TSG-RAN WG2 Meeting #61, R2-080987, Sorrento, Italy, Feb. 11-15, 2017, 1-6.

(Continued)

*Primary Examiner* — Alex Skripnikov
(74) *Attorney, Agent, or Firm* — Murphy, Bilak & Homiller, PLLC

(57) ABSTRACT

Method in a user equipment, a user equipment, a method in a base station and a base station for setting values of system parameters used within a wireless communication system. A first set of parameter values and an associated first tag is sent from the base station to be received and stored by the user equipment. Further, a second set of parameter values and an associated second tag is sent from the base station to be received and stored by the user equipment. When the base station determines to change system information parameters, a command tag is sent, to be received by the user equipment, which apply the set of parameter values associated with the tag corresponding to the received command tag.

14 Claims, 8 Drawing Sheets

(51) Int. Cl.
  *H04W 8/18*   (2009.01)
  *H04W 28/06*  (2009.01)

(56) References Cited

U.S. PATENT DOCUMENTS

| | | | |
|---|---|---|---|
| 8,625,486 B2* | 1/2014 | Wang | H04W 74/0833 370/328 |
| 2005/0177623 A1* | 8/2005 | Roberts | H04W 48/12 709/213 |
| 2008/0039133 A1 | 2/2008 | Ma et al. | |
| 2009/0083424 A1 | 3/2009 | Frederiksen et al. | |
| 2009/0318142 A1 | 12/2009 | Choi et al. | |
| 2010/0074130 A1* | 3/2010 | Bertrand | H04L 1/0007 370/252 |
| 2010/0202371 A1 | 8/2010 | Josiam et al. | |

OTHER PUBLICATIONS

Unknown, Author, "Changes to TS36.300 agreed in RAN3#61 bis and RAN3#62", Change Request, Ericsson, 3GPP TSG-RAN WG3 Meeting #62, R3-083577, Prague, Czech Republic, Nov. 10-14, 2008, 1-147.

3GPP, "3rd Generation Partnership Project; Technical Specification Group Radio Access Network; Evolved Universal Terrestrial Radio Access (E-UTRA); Radio Resource Control (RRC); Protocol specification (Release 8)", 3G pp TS 36.331 V8.11.0, Sep. 2010, 100-101.

3GPP, "3rd Generation Partnership Project; Technical Specification Group Radio Access Network; Radio Resource Control (RCC); Protocol Specification (Release 9)", 3GPP TS 25.331 V9.3.0, Jun. 2010, 1-1785.

3GPP, "3rd Generation Partnership Project; Technical Specification Group Radio Access Network; Evolved Universal Terrestrial Radio Access (E-UTRA); Radio Resource Control (RRC); Protocol Specification (Relsease 9)", 3GPP TS 36.331 V9.3.0, Jun. 2010. 1-250.

* cited by examiner

| | |
|---|---|
| #0: 2DL:3UL | |
| #1: 3DL:2UL | |
| #2: 4DL:1UL | |
| #3: 7DL:3UL | |
| #4: 8DL:2UL | |
| #5: 4DL:1UL | |
| #6: 5DL:5UL | |

| | |
|---|---|
| #0: 3:10:1 | |
| #1: 9:4:1 | |
| #2: 10:3:1 | |
| #3: 11:2:1 | |
| #4: 12:1:1 | |
| #5: 3:8:2 | |
| #6: 9:3:2 | |
| #7: 10:2:2 | |
| #8: 11:1:2 | |

METHODS AND NODES FOR SETTING VALUES OF SYSTEM PARAMETERS USED IN A WIRELESS COMMUNICATION SYSTEM

TECHNICAL FIELD

The present disclosure relates in general to a method in a user equipment, a user equipment, a method in a base station and a base station. In particular, it relates to setting values of system parameters used within a wireless communication system.

BACKGROUND

User equipment (UE), also known as mobile terminals, wireless terminals and/or mobile stations are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment may further be referred to as mobile telephones, cellular telephones, laptops with wireless capability. The user equipment in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a base station, e.g. a Radio Base Station (RBS), which in some networks may be referred to as "eNB", "eNodeB", "NodeB" or "B node", depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. The base stations communicate over the air interface operating on radio frequencies with the mobile stations within range of the base stations.

In 3rd Generation Partnership Project (3GPP) Long Term Evolution (LTE), base stations, which may be referred to as eNodeBs or even eNBs, may be connected to a gateway e.g. a radio access gateway. The radio network controllers may be connected to one or more core networks.

Universal Mobile Telecommunications System (UMTS) is a third generation mobile communication system, which evolved from the GSM. GSM is an abbreviation for Global System for Mobile Communications (originally: Groupe Special Mobile). UMTS is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies.

In 3GPP, the standardization of the Long Term Evolution (LTE) Release 10 of UTRAN is currently on-going. The new radio access network may also be referred to by the acronym E-UTRAN, Evolved UTRAN.

The Radio Resource Control (RRC) protocol is the signalling protocol responsible for configuring and re-configuring lower layers of the user equipment. These lower layers include the physical layer, Medium Access Control (MAC), Radio Link Control Protocol (RLC), and Packet Data Convergence Protocol (PDCP). The RRC protocol is terminated in the base station and the user equipment, respectively.

One important function of the RRC protocol is to distribute System Information. System Information parameter values are distributed from the base station to all user equipment units in the entire cell. System Information is used to configure parameters that are needed by the whole user equipment population, and parameters in System Information are relevant for both Idle and Connected user equipment units. Typically, System Information may be used for distributing information about the carrier, configuration describing common channels and Random Access parameters, and parameters defining how the user equipment may select or prioritize cells, frequencies and Radio Access Technologies (RATs). Also, the Time Division Duplex (TDD) configuration, describing which of the sub frames are for uplink and which are for downlink as well as parameters related to a special sub frame in Time Division LTE (TD-LTE), such as the guard period, may be signalled using System Information.

TDD is an application of time-division multiplexing to separate uplink and downlink frames in time, possibly with a guard period situated in the time domain between the uplink and downlink frames.

In the present context, the expression downlink is used for the transmission path from the base station to the user equipment. The expression uplink is used for the transmission path in the opposite direction i.e. from the user equipment to the base station.

Parameters for system information distribution are grouped into System Information Blocks (SIBs). Currently, there are fourteen such blocks defined in LTE RRC; a Master Information Block (MIB) and thirteen other SIBs. MIB contains the most essential information of the cell. This MIB is transmitted in a separate System Information Message, which in the present context is referred to as SI-M, that has a fixed time and resource position. SIB1 is also transmitted in separate System Information message 1 (SI-1) and comprises, among other things, information of how other SIBs are mapped into system information messages, and how these system information messages are scheduled. SIB1 has a fixed periodicity such as e.g. 80 milliseconds, with repetitions e.g. every 20 millisecond and position in the time domain (subframe #5 every $2^{nd}$ radio frame), but the resources are scheduled with Physical Downlink Control Channel (PDCCH).

Other SIBs (except MIB and SIB1) that need to be transmitted with the same periodicity may be mapped into the same System Information message. These System Information messages are dynamically scheduled by regular indications on the PDCCH control channel. A special identity, System Information-Radio Network Temporary Identifier (SI-RNTI), has been defined to identify scheduling of System Information messages from other traffic on Downlink Shared Channel (DL-SCH). A single SI-RNTI is used for scheduling of all System Information messages on Broadcast Control Channel (BCCH).

Not all SIBs are transmitted in every cell. For example, SIB8 contains parameters for inter-working with Code Division Multiple Access 2000 (CDMA2000), and SIB8 is therefore only transmitted in areas and by operators where such inter-working is relevant.

MIB, SIB1 and SIB2 must be present in every cell, and this group of information is therefore denoted "essential system information" in LTE RRC. A user equipment considers the cell as "barred" in case it cannot find this essential system information.

System Information Messages are sent periodically, where the most frequently needed parameter values may be repeated e.g. every 80 millisecond, while parameter values relevant for accessing the cell, such as e.g. random access parameters could be distributed e.g. every 160 milliseconds. Cell-selection parameters may be repeated with a period of e.g. 320 milliseconds. MIB is per definition scheduled every 40 millisecond.

System Information Change

In some cases, there may be a need to update some system information parameters. For this purpose, a method for system information update has been defined; wherein user equipment units are notified of the change and may re-acquire the updated system information.

The notification used to indicate that system information change will happen, must reach both connected (RRC_CONNECTED) and idle (RRC_IDLE) mode user equipment units. This is realized by the use of a "modification period". System information is changed at the boundary of modification period. The length of the modification period defined as:

modification period=modificationPeriodCoeff*defaultPagingCycle, where parameter modificationPeriodCoeff has minimum value of 2 and defaultPagingCycle has minimum value of 32 radio frames. Thus, the shortest possible modification period is 640 milliseconds. Much longer change periods may also be configured, depending e.g. on the desired paging cycle, as may be seen from the equation above.

The parameters defining the modification period are also broadcasted in the cell, in SIB2.

There are two mechanisms to notify the user equipment units of an upcoming system information change. During the modification period prior to the change, user equipment units in IDLE state are reached by means of paging, where paging message comprises an indication that system information may change at the end of modification period.

In addition, SIB1 includes a ValueTag of 5 bits that shall be changed for each change of system information. This value tag shall be changed at the modification border, such that the new system information is associated with a new value in the ValueTag. Thus, a user equipment that identifies a new value on the tag, e.g. after returning from out-of-coverage, will therefore know whether its stored system information is still valid or not. Stored information whose validity has not been verified for 3 hours is considered invalid in the user equipment.

User equipment units in idle mode are required to monitor the paging channel. A detection of a system information change indication in a paging message will guide the user equipment to re-read system information starting at the next modification border. A user equipment in idle mode that has missed some or all its paging opportunities must verify the validity of system information from the aforementioned ValueTag. A user equipment in connected mode may check either paging or the ValueTag at the modification border to verify the validity of its stored system information.

These general principles are illustrated in FIG. 1A, in which different patterns on the blocks representing system information messages indicate different system information content. Upon receiving a change notification, the user equipment knows that the current system information is valid until the next modification period boundary. After this boundary, the user equipment acquires the new system information. There is a period during which the user equipment does not have valid system information. However, the user equipment is allowed to operate with the "old" system information until it has successfully received the updated information.

LTE TDD and the Parameters of TDD in SI

LTE may operate both in Frequency Division Duplex (FDD) or TDD mode. A key difference between TDD and FDD is that for TDD, the same spectrum is shared between uplink and downlink by means of time division. For LTE TDD, this means that the ten 1 millisecond sub frames of a 10 millisecond radio frame are allocated to uplink or downlink, with the so called special sub frames. A special sub frame has duration of 1 millisecond, and it comprises a Downlink part (DwPTS), a Guard Period (GP) as well as an Uplink part (UpPTS). This is shown in FIG. 1B.

The guard period is utilized to separate uplink and downlink in the user equipment units and the base stations in the presence of propagation delays, and also for allowing the involved user equipment units and the base stations to switch between receiving and transmitting mode. The guard period is typically chosen to match the largest round trip propagation delay in the cell plus the switching time between receiving and transmitting mode of the nodes in the system. The size of the guard period may also be chosen to avoid interference from remote base stations which due to propagation delays are still in the air when the uplink begins, despite the fact that all base stations have ceased transmission at the same time in a synchronized network.

There are currently seven uplink-downlink configurations and nine configurations of the special sub frames. The configurations are illustrated in FIG. 1C and FIG. 1D.

For LTE TDD, the uplink/downlink as well as special sub frame configurations are transmitted in SIB1 as the parameter TDD-Config. Based on this parameter, user equipment units will determine a large number of other settings, such as timing of uplink and downlink control signalling, sounding as well as Random Access Channel (RACH).

From an operator perspective, the TDD spectrum asset offers a potential to select uplink and downlink resource configuration depending on the deployment and services offered. A more symmetric configuration may be chosen for symmetric services such as Voice over Internet Protocol (VoIP), whereas a downlink heavy configuration may be suitable for multimedia distribution such as mobile television and web browsing producing typically more data for downlink direction.

TDD systems built for wide area coverage, also known as macro base stations, typically tend to use the same TDD-config in all cells within the wireless communication system. This way interference between uplink and downlink is avoided. At the same time, for other deployments, such as femto, pico or micro base stations, these requirements may be relaxed, especially for the case with low to medium load. One reason being that the propagation conditions are expected to very different between base stations as well as the transmission powers. An important scenario is femto base stations, which may be user deployed for example in home environments, and where the number of user equipment units served by each base station is small, and where the isolation between different base stations may be large in combination with low output powers.

A difference of packet data as compared to voice services is that it is bursty, on-off and asymmetric. During file download phase, the downlink traffic is dominating whereas during upload phase, the uplink traffic will dominate. Furthermore, Transmission Control Protocol (TCP), being the dominating transport protocol on the Internet, is elastic in its nature. The TCP source probes the available bandwidth of the network. Because of this, the offered load does not stay constant over the download/upload procedure.

To maximize the efficiency and more importantly improve the user experience in terms of file transfer time and latency, it is desirable to adapt the resource allocation to the actual resource needs in up- and downlink, respectively. Obviously, performance benefits are achievable by adapting the resources to the actual load in uplink and downlink as compared to using a fixed allocation. Furthermore, to be able to follow rapid variations in the resource need, which are expected in packet data applications, a dynamic and efficient mechanism is needed so that the TDD-config may be updated efficiently and quickly.

Another important case where there is a need to adapt the TDD-config is the case with interference between base stations separated large distances. Due to atmospheric propagation phenomena, the isolation between base stations may vary, and at certain occasions, base stations at very large distances may be heard by each other for a limited amount of time. It is inefficient to dimension a large guard period and use it all times, despite that a large guard period is only needed a small fraction at a time. From this perspective, an efficient and rather rapid mechanism to change the TDD-Config is desirable.

There are also other parameters carried in system information that may need frequent updates. One is Random Access Channel (RACH) configuration used to determine the resources, time and frequency, for random access attempt. It may be expected that the amount of user equipments, and/or other devices communicating over a wireless interface in the wireless communication system will increase significantly in future when different kind of Machine-to-Machine (M2M) applications will become popular. In this case, the RACH may be a bottleneck of the system and thus the network needs dimension RACH allocation adaptively.

A third motivator for rapid system information changes may be the desire to save power in the base station. At times of low or non-existent load in a cell, the base station may want to adjust certain parameters of the cell, such that electrical power may be saved.

Thus, there are situations when there is a need to change values of system information parameters. A particular, but non-limiting example concerns the dynamic-TDD case above, where there may be a desire to dynamically change system information parameters rather frequently. In particular, it may be noted that in dynamic-TDD, it may be a desire to change system information parameters, even as often as once every second, or even more frequently. A third non-limiting example concerns energy efficiency in the base station, where e.g. the number of used antenna ports, carrier bandwidth or alike could be changed.

As will be further described below, the previously known method for system information change is too time consuming, inefficient and inapplicable.

First, in prior art, the system InfoValueTag may be incremented when the system info is changed. Since systemInfoValueTag has 32 values in LTE RRC, this means that system information may be changed only 31 times in 3 hours resulting the minimum average validity period of 5.6 minutes for each set of system information parameters. Some changes of parameters could hypothetically occur faster, however with the expense that other sets of parameters would then have to be valid for a longer period. In any case, the value tag of 5 bits together with the 3 hour validity does not allow for very frequent system information changes.

If a value tag would be reused for two different sets of system information parameters within 3 hours, there is a risk that a user equipment uses the wrong set of parameters in its communication with the wireless communication system. Depending on the mismatch the consequences could be arbitrarily severe.

Validity times in the order of minutes rather than seconds may for some parameters be too long, i.e. there it is a need to change the parameters more dynamically. Such parameters may comprise, but are not limited to, e.g. RACH parameters or TDD configuration.

Further the user equipment is instructed to read the whole system information if the systemInfoValueTag has changed from a previous value.

As a further issue, it is to be noted that there is a period after the modification border during which the user equipment may have the wrong system information parameters. If system information is changed rarely, e.g. once in an hour or so, the relative time during which the user equipment uses wrong values may not be that detrimental. However, if the periodicity of the message containing the relevant parameters is e.g. 320 milliseconds, then this period is not negligible if the parameter change period is counted in seconds rather than hours.

As a non-limiting example, due to changes in traffic load, the network may want to change TDD configuration. Another possibility is that due to interference, e.g. temporary interference between uplink and downlink (base station-to-base station or UE-to-UE), the TDD guard period (GP) between uplink and downlink needs to be increased, or perhaps decreased due to the absence of such interference. As mentioned above, this avoids operating the system at all with an un-necessarily large guard period.

The corresponding TDD parameters are in in SIB1 having 7 different values for uplink/downlink configuration and 9 values for the special sub frame configuration including length of the guard period. Reading all system information blocks take time, which in turn makes the period when the user equipment have wrong system information long. Also reading the whole system information consumes the batteries of the user equipment.

Therefore, and with the TDD configuration change as a non-limiting example, the user equipment may operate with the wrong configuration until it has re-read SIB1, wherein the user equipment re-read all other system information, even if that system information has not changed.

Further, there is no method to quickly inform the user equipment that it should change the parameter values in its configuration. It may be that the base station detects that the user equipment has e.g. wrong TDD configuration.

One existing way to inform the user equipment about correct configuration is to send RRCConnectionReconfiguration with mobilityControl field, i.e. to perform an "intra-Cell handover". This operation will result the user equipment to receive updated system information parameters. However, this handover (back) to the current cell results in some procedures such as Random Access and/or reset of RLC, Packet Data Convergence Protocol (PDCP) and MAC which may be unnecessary. Furthermore, the user equipment needs to be in connected state for enabling the reconfiguration.

The current method of notifying user equipment units of an upcoming change is also rather costly in terms of radio resources, in case the changes occur frequently. This is particularly true since every paging slot needs to be used for sending the indication carried in a Paging message, during the change period prior to the change. In addition, paging all user equipment units often, such as e.g. every modification period, consume resources that could be otherwise used for data transmission.

Therefore, there is a need for a new method for system information change, where it is possible to quickly set values of system information parameters without the aforementioned problems occurring. In particular, there is a need for a solution where system information may be changed as often as e.g. once a second or even more frequently without running into the aforementioned problems.

SUMMARY

It is therefore an object to obviate at least some of the previously described disadvantages and to improve the performance in a wireless communication system.

According to a first aspect, the object is achieved by a method in a user equipment. The method aims at setting values of system parameters used within a wireless communication system. The method comprises receiving a first set of parameter values and an associated first tag, from a base station. The received first set of parameter values and the associated first tag are then stored by the user equipment in e.g. a look-up table in a memory. Further, also a second set of parameter values and an associated second tag are received from the base station and stored by the user equipment. When a command for setting the values of system parameters is received from the base station, which command comprises a command tag, the user equipment apply the set of parameter values which is associated with the tag corresponding to the received command tag. Thus, the first set of parameter values, associated with the stored first tag may be applied if the stored first tag corresponds to the received command tag. Alternatively, the second set of parameter values, associated with the stored second tag may be applied, if the stored second tag corresponds to the received command tag.

According to a second aspect, the object is achieved by a user equipment. The user equipment is configured for setting values of system parameters used within a wireless communication system. The user equipment comprises a receiver. The receiver is configured to receive a first set of parameter values and an associated first tag and a second set of parameter values and an associated second tag, from a base station. Further, the receiver is also configured to receive a command comprising a command tag from the base station. The user equipment further comprises a memory configured to store the received sets of parameter values and the tag associated with each respective set. Further, the user equipment also comprises a processing circuit. The processing circuit is configured to apply the first set of parameter values associated with the stored first tag if the stored first tag is corresponding to the received command tag or applying the second set of parameter values associated with the stored second tag if the stored second tag is corresponding to the received command tag.

According to a third aspect, the object is achieved by a method in a base station. The method aims at setting values of system parameters used within a wireless communication system. The method comprises transmitting a first set of parameter values and an associated first tag, to be received by a user equipment. Also, the method comprises transmitting a second set of parameter values and an associated second tag, to be received by the user equipment. Further, the method comprises transmitting a command comprising a command tag associated with the set of parameter values to be applied within the wireless communication system.

According to a fourth aspect, the object is achieved by a base station. The base station is configured for setting values of system parameters used within a wireless communication system. The base station comprises a transmitter. The transmitter is configured to transmit a set of parameter values, associated with a tag. The transmitter is further configured to transmit a command comprising a command tag associated with the set of parameter values to be applied within the wireless communication system.

Embodiments of the present methods and nodes enable the possibility to perform system information change more efficiently. By enabling the user equipment to read the values of the system information parameters in advance, before they are actually to be applied, and associating each such set of parameter values with a tag, it is possible to quickly switch from one set of parameter values to another set of parameter values by only transmitting a tag corresponding to the set of parameter values to be applied. Thereby is it possible to dynamically adapt the system parameters within a cell for optimal performance e.g. by toggling between different values related to the system information. The user equipment does not have to re-read the set of values to be applied every time, which save energy resources of the user equipment as well as time. By transmitting a tag representing a set of parameter values, instead of the parameter values as such when system information change is desired, overhead transmission in the system is decreased, leading to less (risk of) interference, less occupation of signalling resources, less energy consumption at the base station and an overall increased efficiency. Thereby is an improved performance in a wireless communication system achieved.

Other objects, advantages and novel features will become apparent from the following detailed description.

BRIEF DESCRIPTION OF THE DRAWINGS

Embodiments of the present methods and nodes are described in more detail with reference to attached drawings illustrating exemplary embodiments and in which:

FIG. 1C is a schematic block diagram illustrating uplink/downlink configurations in a wireless communication network according to prior art.

FIG. 1D is a schematic block diagram illustrating special subframe configurations for normal subframe in a wireless communication network, according to prior art.

DETAILED DESCRIPTION

The present methods and nodes are defined as a user equipment, a method in a user equipment, a base station and a method in a base station for setting values of system parameters used within a wireless communication system. The herein disclosed may be put into practice in the embodiments described below. These methods and nodes may, however, be embodied in many different forms and are not to be considered as limited to the embodiments set forth herein; rather, these embodiments are provided so that this disclosure will be thorough and complete, and convey the scope of the claims to those skilled in the art.

Figure 1A:
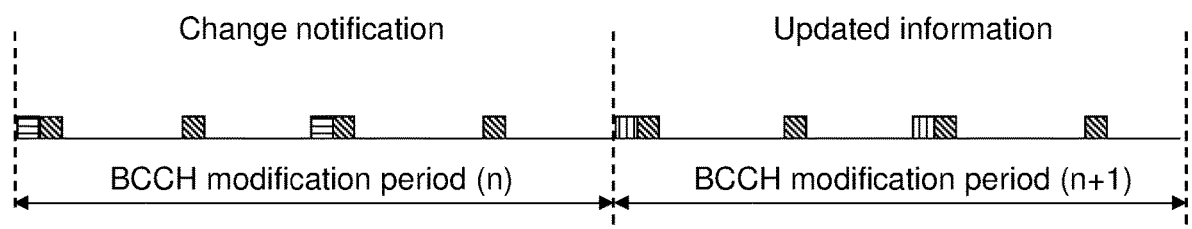
FIG. 1A is a schematic block diagram illustrating a change of system information in a wireless communication network, according to prior art.
Figure 1B:
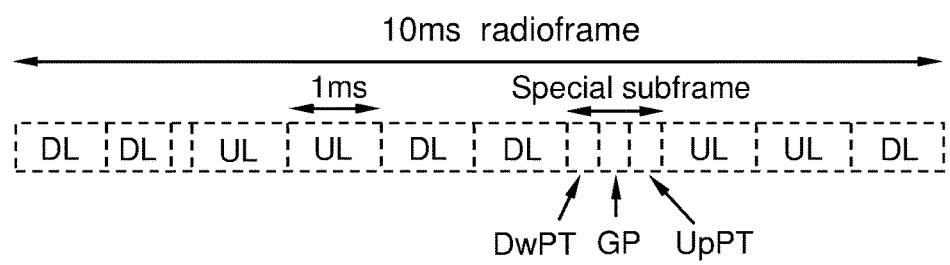
FIG. 1B is a schematic block diagram illustrating a frame structure in a wireless communication network, according to prior art.
Figure 2:
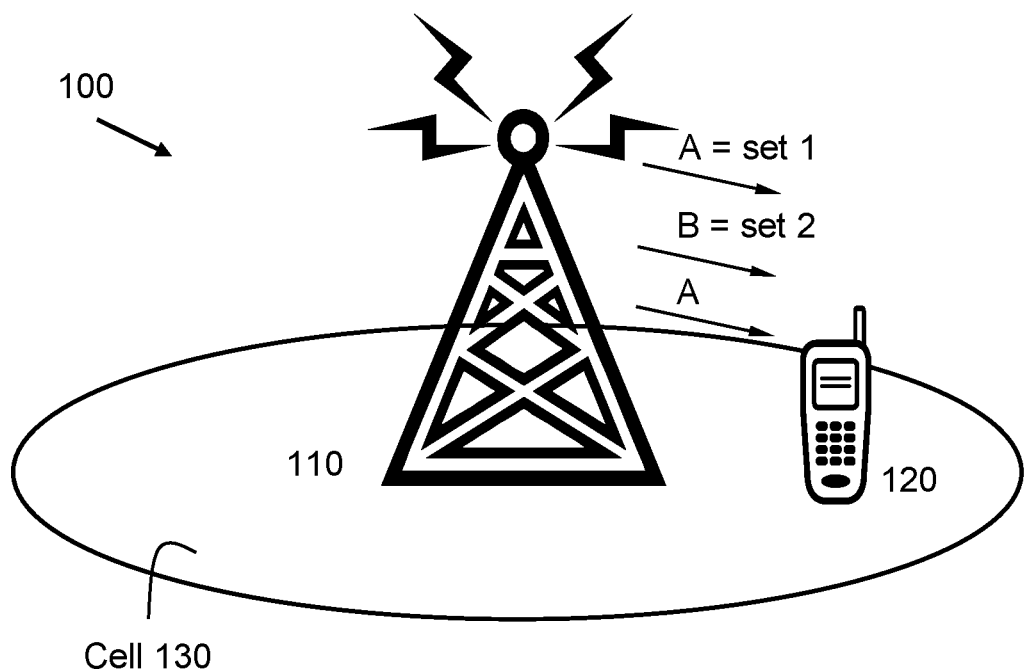
FIG. 2 is a schematic block diagram illustrating a wireless communication network according to some embodiments.

FIG. 2 depicts a wireless communication system 100, based on at least one of such technologies as 3GPP LTE and its evolutions e.g. LTE-Advanced, but also Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), or according to any other wireless communication technology etc, just to mention some few non limiting examples.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink frames in time, possibly with a guard period situated in the time domain between the uplink and downlink frames. FDD means that the transmitter and receiver operate at different carrier frequencies.

The purpose of the illustration in FIG. 2 is to provide a general overview of the present methods and the functionalities involved. The herein described methods and nodes are elaborated with specific reference to LTE networks. Thus the wireless communication system 100 is described as an LTE system such as e.g. a 3GPP/e-UTRAN environment throughout the rest of the disclosure, for enhanced comprehension and readability. However, the corresponding concept may also be applied in any other wireless system 100, based on other radio access technology, such as e.g. the ones previously enumerated.

The wireless communication system 100 comprises a base station 110, and a user equipment 120, arranged to communicate with each other. The user equipment 120 is situated in a cell 130, served by the base station 110. Although only one single cell 130 is illustrated in FIG. 2, which cell 130 is served by the base station 110, it is to be understood that the base station 120 may be in charge of more than one cell 130.

Further, in the illustrated non limiting exemplary embodiment of the wireless communication system 100 is only one instance of a base station 110 and one instance of a user equipment 120 depicted, in order to augment the understanding of the present methods and nodes. However, it is to be noted that the illustrated setting of network nodes 110, 120 is only exemplary. The wireless communication system 100 may comprise further network nodes 110, 120 such as base stations 110 and/or user equipment 120 in any number and combination.

The user equipment 120 is configured to transmit uplink radio signals comprising information data to be received by the base station 110. Further, the user equipment 120 is also configured to receive downlink radio signals comprising information data transmitted by the base station 110.

The user equipment 120 may be represented by e.g. a wireless communication terminal, a mobile node, a mobile station, a mobile cellular phone, a Personal Digital Assistant (PDA), a wireless platform, a laptop, a beacon, a computer or any other kind of device configured to communicate wirelessly with the base station 110.

The base station 110 may be represented by e.g. Radio Base Stations (RBSs), macro base stations, NodeBs, evolved Node Bs (eNBs, or eNode Bs), base transceiver stations, Access Point Base Stations, base station routers, micro base stations, pico base stations, femto base stations, Home eNodeBs, relays and/or repeaters, sensor, beacon device or any other network node configured for communication or signal transmission over a wireless interface, depending e.g. of the radio access technology and terminology used.

Herein, a connection between any network nodes such as the base station 110 and/or the user equipment 120 may comprise e.g. a logical connection such as e.g. a connection via higher-layer protocols through one or more network nodes, or a physical connection such as e.g. a direct connection.

Figure 3:
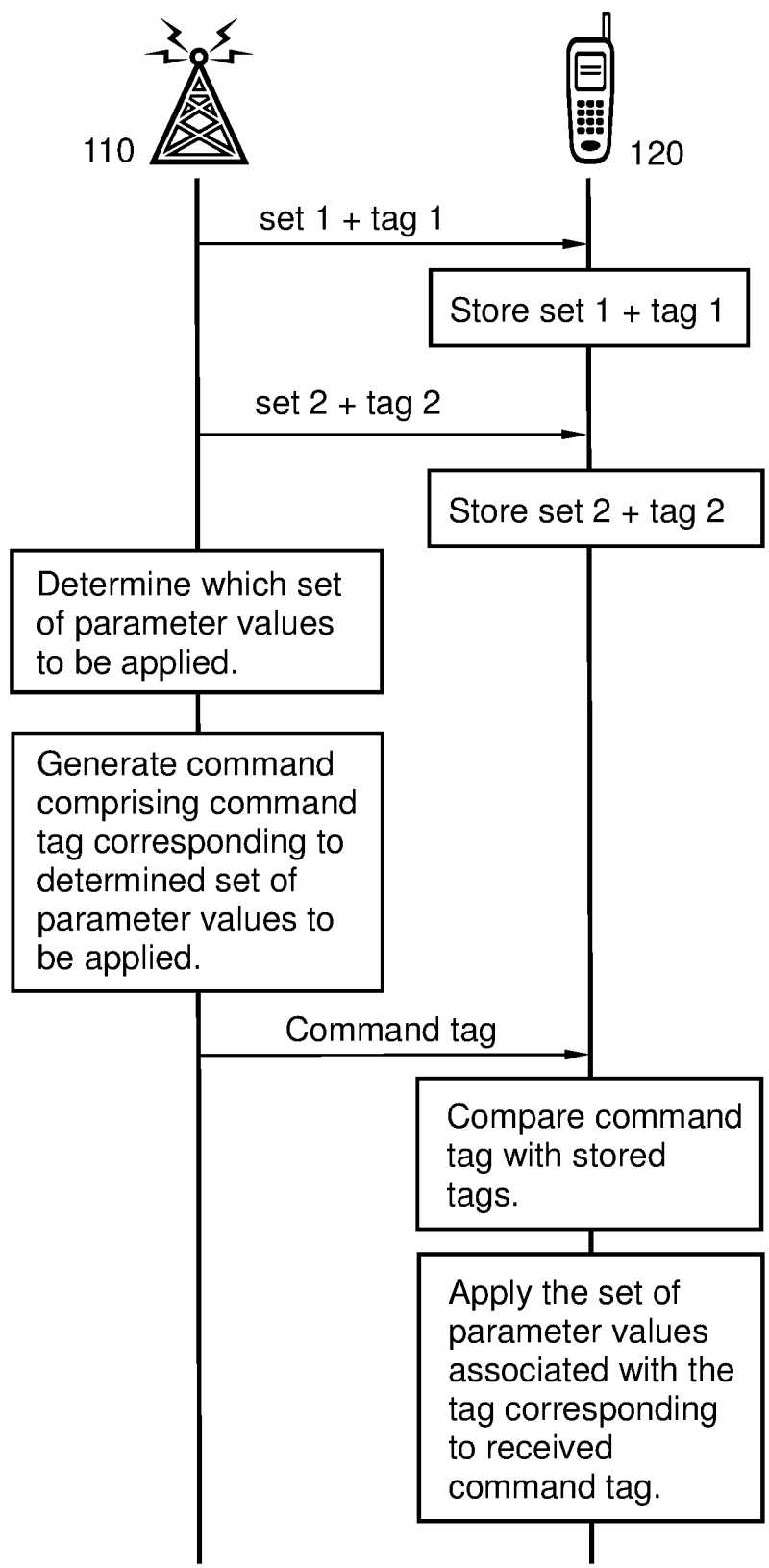
FIG. 3 is a combined flow chart and block diagram illustrating a method according to some embodiments.

FIG. 3 illustrates an exemplary embodiment of the present methods and nodes for making the system information change more efficient may comprise one or more of the following aspects:

A tag that may take at least two distinct values may be defined, where each value of the tag is associated with at least one parameter value of system information, or a set of such system information parameter values.

The base station 110 may transmit the set of parameter values and the associated tag, to be received by the user equipment 120. Such transmission may comprise one set of parameter values and the associated tag, or several sets of parameter values, each associated with a distinct tag which is also transmitted in conjunction with the corresponding set of parameter values with which they respectively are associated.

The user equipment 120 may receive and store both the set of system information parameter values and the associated tag.

Upon detection that the value of a command tag has changed, or that a command tag associated with a different set of parameter values than is concurrently utilized by the user equipment 120 is received, the user equipment 120 may change the parameters and/or parameter values used by it, without re-reading the whole system information. The user equipment 120 may take the other, currently valid set of system information parameter values into use directly, without having to re-read it as it is already stored in a memory by the user equipment 120. Thereby processing power and time are saved. Also, an instant change of system information and/or toggling between different sets of system information parameters is enabled. It is thereby possible to utilize the optimal set of system information parameter values at any time within the cell 130.

Alternatively, according to some embodiments, the application of the other set of parameter values may be delayed for some configurable or pre-defined period of time after reception of the command tag. In any case, the present methods render it possible to toggle between different sets of system information parameter values without re-reading system information. Thereby, an improved performance within the wireless communication system 100 is achieved.

A system information change may according to some embodiments be notified during one first time period, and the actual change of system information parameters may be performed in the next time period, or any later time period.

Further, the base station 110 continuously, or at certain time intervals may determine which set of parameter values to be applied within the cell 130, for the particular user equipment 120, for a predefined or configurable subset of user equipment 120 situated within the cell 130, or for all user equipment 120 within the cell 130, according to different embodiments.

When the base station 110 has determined which set of parameter values to be applied, it may generate a command comprising a command tag associated with the set of parameter values to be applied, according to some embodiments.

Secondly, and according to another aspect of some embodiments, a configurable meaning of MIB information may be provided. Thereby may the user equipment 120 according to some embodiments be configured to interpret a bit or code-point value received in MIB in different ways depending on the received configuration. Further, the user equipment 120 may receive information how to interpret bits or code point values in MIB, which information may be received in another form of message. In a particular embodiment, one or multiple bits in the MIB may be configured to be associated with one system information parameter value, or a set of such system information parameter values. When the user equipment 120 receives a code point of the aforementioned MIB bits, it may according to some embodiments change the value of the system information parameter value, or set of such system information parameter values according to the aforementioned configuration. Thus, and according to this aspect, the MIB bits may be configured to be used as a command tag. However, in a different configuration, the same bits may be configured for another, arbitrary purpose.

Thus, embodiments of the present methods and nodes are configured to define a command tag or other dynamic indicator in the MIB, and it is realized that MIB comprises some non-reserved bits, which also may be referred to as Spares, that may be used e.g. for this purpose in a future release of the LTE RRC protocol. However, reserving these scarce bits for a particular purpose may not be desirable, as there might be multiple conflicting needs to comprise additional indicators or information in MIB.

In yet another aspect, the aforementioned command tag associated with a set of parameter values may be conveyed in a PDCCH indication and this indication may be configured by the network according to some embodiments. The indication may be used for indicating dynamic system information change according to the present method. In embodiments of this aspect, the configuration may comprise configuring a periodicity i.e. time-slots, at which the indication may occur, the detailed system information aspects associated with the indication etc. In further embodiments, the indication or command tag may be conveyed in a Paging message, in a MAC control element, or using an RRC message according to different alternative embodiments.

Thus, there are multiple ways of providing the parameter values and corresponding associated command tags to the user equipment 120, such as e.g. MIB code-points, PDCCH, MAC control element indications, or RRC messages, just to mention some options. These ways further comprises signalling this configuration to the specific user equipment 120 with a dedicated message, or to broadcast the configuration on a broadcast channel, such that all user equipment 120 within the cell 130 may receive it. If provided on a broadcast channel, the configuration may be provided in a System Information Block, SIB.

Figure 4:
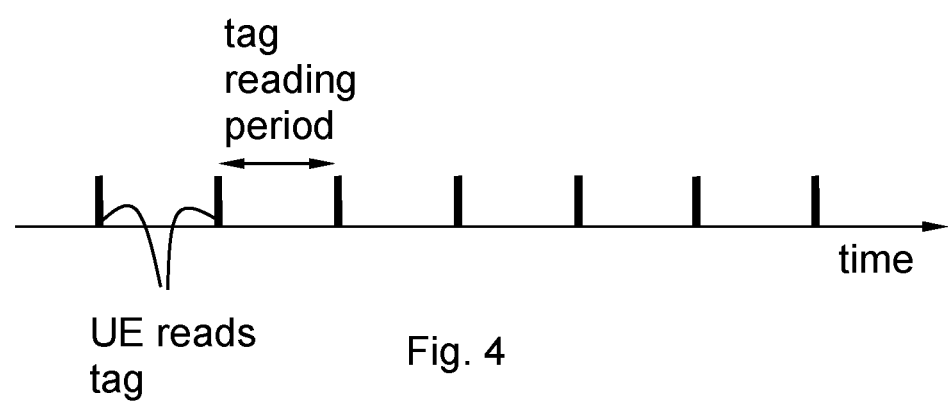
FIG. 4 is a schematic block diagram illustrating periodic indications of system information change, or toggling according to some embodiments.

In addition, according to some embodiments, a method of signalling a command tag-reading period from the base station 110 to the user equipment 120 that is different from the BCCH modification period, where the user equipment 120 is required to read the value of the command tag, the configurable MIB bits, PDCCH indication, Paging message or similar at particular instances, is provided. This is further illustrated in FIG. 4, illustrating some exemplary tag reading periods, which intensity may be predefined or configurable. The user equipment 120 thus may read the value of the command tag at these occasions. If the user equipment 120 finds that the command tag, comprised e.g. in MIB bits or similar indication has changed, the user equipment 120 may parse the new command tag against stored tags. If a corresponding stored tag is encountered, the set of parameter values associated with that tag be taken into use without re-reading system information. The command tag-reading period may be signalled from the base station 110 to the user equipment 120 by a dedicated message, or by a broadcast message according to different embodiments.

Returning now to FIG. 3, in yet another embodiment, it may occur that some user equipment units 120 have not acquired the correct system information for some reason. Such reasons may comprise e.g. that the user equipment 120 is in idle mode, that the user equipment 120 may not follow the dynamic changes of system information, and therefore would benefit from receiving the aforementioned updates once entering the connected state. In the present context, idle mode is the state of the user equipment 120 when it is switched on but does not have any established RRC connection. When in connected mode, the user equipment 120 is switched on and an RRC connection is established. Thus, a user equipment 120 that has not acquired the correct system information may be updated with correct system information, such as e.g. the TDD configuration, by sending a dedicated message comprising the correct or updated system information parameter values. The benefit of this approach is that no handover is needed to update user equipment 120 that for some reason or another have not acquired the system information that is currently in use.

Thus, to summarise some exemplary aspects according to some embodiments of the present methods, the method in a user equipment 120 may comprise storing multiple sets of system information parameter values, and receiving an indication such as a command tag, that one of these sets is to be applied and utilized, and taking that set into use. Embodiments of methods performed in the base station 110 comprises signalling one or several sets of system information parameter values, each associated with a distinct tag, which are to be received and stored by the user equipment 120, or a subset of user equipment 120 within the cell 130. MIB bits and corresponding code-points may be configured, such that they may be utilised for multiple purposes, wherein one purpose is to comprise the command tag associated with the set of parameters to be applied according to some embodiments. Further, a command tag-reading period may be signalled from the base station 110 to the user equipment 120 according to some embodiments. The signalled command tag-reading period may define when the user equipment 120 may read the aforementioned indications or MIB code-points. In some further embodiments, additional actions for conveying the indication, or command tag, using PDCCH, Paging, MAC control elements or RRC signalling may be comprised. Further, according to some embodiments, a system parameter configuration of a particular user equipment 120, such as e.g. TDD configuration may be corrected.

Further exemplary non-limiting, non-exclusive examples of embodiments will now be disclosed and described more in detail, with reference made in particular to FIG. 2, FIG. 3 and FIG. 4.

Consider the user equipment 120 in the cell 130, as illustrated in FIG. 2. The user equipment 120 may preferably be in connected state, i.e. the user equipment 120 may be registered and known to the base station 110 in control of the cell 130, but it may also occasionally be in idle state. Here, an embodiment is described addressing a single user equipment 120 in one cell 130. As illustrated in FIG. 2, the user equipment 120 receives a first set of system information parameter values, set 1, associated with a first tag A.

The user equipment 120 receives, or reads, system information parameter values of the first set, set 1, associated with the first tag A. Also, the user equipment 120 receives, or reads, system information parameter values of a second set, set 2, associated with a second tag B.

The first set and the second set of system information parameter values may differ in that at least one parameter has a different value in one of the first or the second sets. It may also be that multiple parameters take different values in the two sets. Or, it may be that some parameter is present in one of the sets, but not in the other set. The sets are associated with different tags, e.g. so that a first set of parameters is tagged with the value "A", and a second set of system information parameters is tagged with the tag "B", such that also the tags are received by the user equipment 120.

The system information parameter values and the respective associated tag A, B may be transmitted to the user equipment 120 by many different means according to different embodiments. For example, the first set associated with the tag A may be broadcasted in the cell 130, while the second set associated with the tag B may be provided in many different ways. For example, it may be that only the parameters and/or parameter values that are different between the sets are signalled to the concerned user equipment 120. Thereby may resources and time be saved as less information has to be transmitted. Further, the overall system efficiency may be increased as less overhead information has to be transmitted and also the potential risk of interference may be decreased.

To be specific, it may be that all parameter values in the first and the second sets are the same, except those defining the TDD configuration. In such a case, the TDD configuration of the second set may be provided on the same broadcast channel, in a SIB, or it may be provided to the user equipment 120 using dedicated signalling. If provided over a broadcast channel, the parameters defining the configuration of the second set of parameters, i.e. the ones differing from the first set of parameters may preferably be provided as optional extensions to the broadcasted messages carrying the configuration of the first set. Furthermore, according to some embodiments may both the first set and the second set be provided during different modification periods on the broadcast channel. Then the tags A, B to be associated with the respective sets may be the value tags carried in SIB1 messages, correspondingly, according to some embodiments.

Further, if there are additional parameter values that differ between the sets, then those may also be provided to the user equipment 120. There may also be additional sets, such as a third, a fourth etc. that may be conveyed to the user equipment 120 with associated tags. Thus the user equipment 120 may be aware of different sets of system information parameter values such as e.g. two such sets, and the user equipment 120 may have to know which of the sets to be applied. It is to be noted that any number of sets of system information parameter values and corresponding tag may be applied within the present method.

According to some embodiments, there may be provided means for signalling which of the sets that is currently in use. Thus the base station 110 may provide a signalling method for indicating that the user equipment 120 may use the first set, and when changed, the user equipment 120 may be informed that the user equipment 120 may use the second set of parameter values.

A particular benefit of some embodiments is that the user equipment 120 may take the other, e.g. second set into use, upon reception of the indication, i.e. command tag, since the user equipment 120 has stored the set of system information and the associated tag. Thus an indication of changed system information implies that the user equipment 120 may have to re-read system information after the change of modification period according to some embodiments.

Thus, embodiments of the present method therefore provide fast toggling between different sets of system information. The notation "take into use" does not necessarily imply that the user equipment 120 needs to take the set "B" into use instantly, at the reception of the command tag. The user equipment 120 may according to some embodiments delay the change of system information parameters for a period of time, such as e.g. 40 or 80 milliseconds, after the reception of the command tag. Further, the command tag may comprise information of a point in time when the set of parameter values are to be utilised. It is to be noted that these time periods/time points mentioned in the present context are merely some non-limiting examples. The time delay may comprise any other arbitrary period of time, or point in time.

The command tag for toggling between different system information versions may be provided, e.g., by that a ValueTag is toggled in SIB1. In the present context, the expressions command tag and ValueTag may comprise the same subject-matter and may sometimes be used as synonyms.

However, it may be realized that there are other ways of conveying this information that may have particular benefits. It may further be noted that, if the valueTag (command tag) in SIB1 would be used directly as a means for indicating the "toggling" above, it may result in "confusion" among some user equipment 120, for example user equipment which are not configured according to the present method. Thus, a plurality of means for indicating the toggling or change may be utilized, as further described below, according to some embodiments.

According to some embodiments related to this issue, a number of spare bits available in MIB may be identified. It may further be observed that MIB is transmitted more frequently than SIB1 (40 milliseconds versus 80 milliseconds), and it may therefore be beneficial to provide the indication in MIB instead of in SIB1, as a shift between system information parameters may be changed faster. In addition, it may be noted that the error coding of the MIB repetitions are typically so robust, since a MIB may be decodable also outside the serving cell 130, i.e. also in neighbour cells, that a user equipment 120 in reasonable proximity to the transmitting base station 110 may often receive the MIB without any repetition. In such cases, the user equipment 120 may be able to successfully decode MIB within one subframe of 1 millisecond every 40th millisecond. Furthermore, the repetitions of the MIB may be self-decodable, thereby reducing the periodicity of MIB reception to e.g. 10 milliseconds according to some embodiments. Thus, MIB may provide good means for conveying which system information is in use, if room is given for signalling the aforementioned flag in MIB.

Now, it may not be desirable to reserve any scarce bits or code-points in MIB for any such specific purpose as e.g. a system information "flag".

Embodiments of the present method may be adapted for configuring the meaning of MIB bits (code points), where a user equipment 120 that may receive this configuration may be configured to interpret bit (code point) values in MIB according to the configuration. The configuration may be provided e.g. by higher-layer signalling, either over a broadcast channel e.g. in a SIB, or using a dedicated message, according to some embodiments.

In a particular embodiment, this configuration provides bit (code point) values in MIB associated with sets of system information, where each bit (code point) value is associated with a particular set of system information. For example, code point 010 of three bits may be connected to system information set "A", and code point 011 may be connected to system information set "B". It is to be noted, that this method of configuring the different code points in MIB are then not limited to the various embodiments related to system information change, but the same code points, in this exemplary illustration, 010 and 011 may, in a different cell or in the same cell 130, but at a different time, be configured to represent some other information. As non-limiting examples, the same code point i.e. 010 and 011 may then indicate "cell barred", or "energy saving is on", or whatever upcoming feature that is considered necessary to broadcast in MIB. This embodiment may therefore allow for particular flexibility in signalling by reusing valuable bits in MIB for the particular needs at hand.

It is thus to be noted that the dynamic configuration of the bits (code points) in MIB according to some embodiments may determine how to utilize the available non-reserved bits (code points), or spares, in MIB.

In a further action the base station 110 may transmit the information concerning how to utilize the available non-reserved bits in MIB, to be received by the user equipment 120. Such information may be transmitted in a SIB message, according to some embodiments.

In a further action a MIB message comprising information in the non-reserved bits may be transmitted from the base station 110 to be received at the user equipment 120. The non-reserved bits of the MIB may then be utilized, i.e. encoded according to the previously determined purpose.

Thereby the user equipment 120 is enabled to receive information comprised in the non-reserved bits of the MIB and utilize them, i.e. decode them according to the previously received information concerning how to utilize the non-reserved MIB bits.

The dynamically configurable bits in MIB may be utilized e.g. to specify what system information blocks are in use in the cell 130, and/or how they may be accessed, according to some embodiments.

In addition to the embodiments comprising the ValueTag in the embodiment involving communication in SIB1, and/or the embodiment involving communication in MIB described above, it is herein further described and comprised embodiments wherein the sets of system information may be used by the user equipment 120. For example, there may be a new indication on PDCCH, conveyed e.g. with a new RNTI designed for the purpose of conveying this information to the user equipment 120. Alternatively, the information may be provided in a paging message according to some embodiments. In yet further embodiments, information concerning which system information set to be utilized may be conveyed by using a MAC control element, or an RRC message.

However, in order for the base station 110 to control when and how often system information is to be changed within the cell 130, the base station 110 may configure the user equipment 120 to read or receive the relevant command tag or other information that may indicate which system information to utilize, at particular time instants or with a particular periodicity, according to some embodiments. Such features may be particularly applicable when the indication is provided by means of broadcast within the cell 130, such as e.g. a broadcast using MIB as described above, a broadcast of a command tag or broadcasting of a command tag over PDCCH, or similar. Thereby, according to some embodiments, the base station 110 may easily decide how frequently it wants to be able to change system information and thereby making the information change available to the user equipments 120 within the cell 130.

In response to receiving the configuration about this periodicity or time-instances, the user equipment 120 may read the relevant information on a broadcasted channel, or any other appropriate channel, to find out what system information to utilize, i.e. if the user equipment 120 is to change system information. The benefit of this embodiment is that the base station 110 may easily trade between the desire to change system information frequently, and the desire to allow the user equipment 120, or sets of user equipments, to save battery resources by not waking up too frequently for broadcast information reading. For example, if the base station 110 sees no immediate reason for changing system information, it may set the period to infinity, or to a high value, i.e. disabling the reading of the system information and/or system information version (command) tag and/or change information, according to some embodiments. In contrast, if the base station 110 wants to change system information frequently, it may set this period to a low value, i.e. that the reading times occur frequently. The reading of the command tag information may also be aligned with a disrupted transmission DRX mechanism in such a way that the user equipment 120 may receive the command tag when it is anyway active in monitoring PDCCH.

The idle user equipment 120 may have a wrong configuration of system information parameters or values of such parameters when the embodiment of the present method is applied. This may be the case e.g. if it is defined that only user equipment 120 in connected mode, or a specific configured set of user equipments 120 may be required to follow the dynamic system information changes herein described. According to some embodiments, the correct parameters may be indicated with a dedicated approach. For example, the parameters may be provided when the user equipments 120 performs Random Access. The indication may be e.g. a specific CRNTI on PDCCH, a MAC control element or a RRC message, according to different embodiments. Furthermore, such dedicated message may be limited to be utilized only in specific occasions such as Message 4 (contention resolution) in Random Access procedure.

Some legacy user equipment, e.g. according to Release 8 or 9 of LTE, may not be able to receive dedicated signalling according to the discussed embodiments. In such scenario, such user equipments may be scheduled assuming a specific default configuration over some period and finally when they are connected, RRCConnectionReconfiguration may be applied. Alternatively, scheduling of such legacy user equipment may be delayed to some specific time point, when system information is changed using existing methods and legacy user equipments have received updated information. The "default" configuration may be selected in such a way that user equipment measurements are not disturbed.

Figure 5:
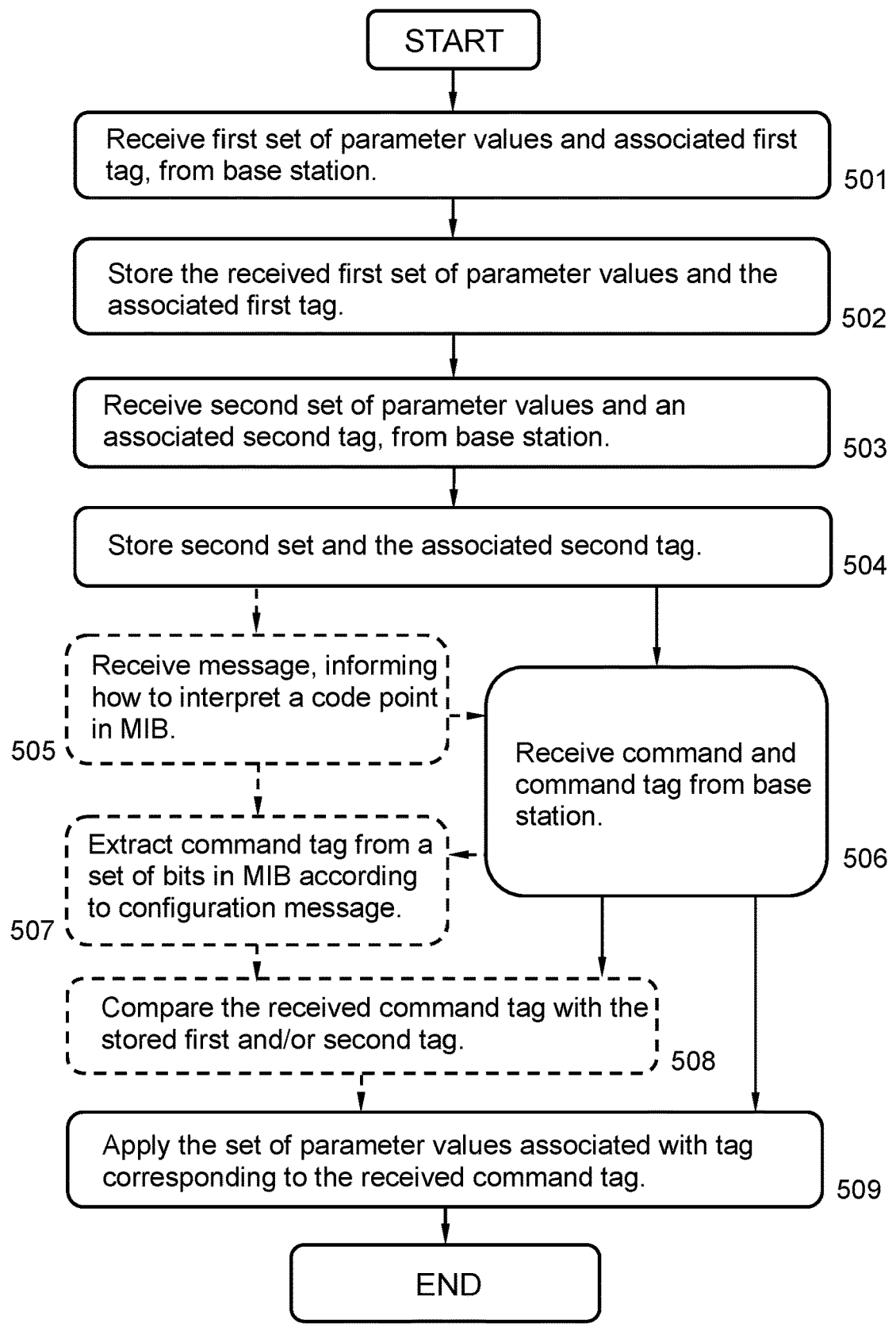
FIG. 5 is a flow chart illustrating an embodiment of the present method in the user equipment, according to some embodiments.

FIG. 5 is a flow chart illustrating embodiments of method actions 501-509 in a user equipment 120. The method aims at setting values of system parameters used within a wireless communication system 100. The user equipment 120 and a base station 110 are comprised in the wireless communication system 100. The wireless communication network 100 may be e.g. an LTE radio network. The base station 110 may be e.g. an eNB according to some embodiments. The user equipment 120 may be mobile telephone or similar. The method may be performed within a cell 130, served by the base station 110. A system information change may according to some embodiments be notified during one first time period, and the actual change of system information parameters may be performed in the next time period, or any other later time period.

To appropriately set the values of system parameters, the method may comprise a number of actions 501-509.

It is however to be noted that some of the described actions, e.g. any of the actions 501-509 may be performed in a somewhat different chronological order than the enumeration indicates and that some of them, e.g. action 505 and 507, are performed within some alternative embodiments. Further, any, some or all actions, such as e.g. 501 and 503 may be performed simultaneously or in a rearranged chronological order. The method may comprise the following actions:

Action 501—A first set of parameter values and an associated first tag are received from the base station 110.

Action 502—The received first set of parameter values and the associated first tag are stored. The first set of parameter values and the associated first tag may be stored in a memory comprised within the user equipment 120, or readily accessible to the user equipment 120. The parameter values and the associated first tag may be stored e.g. in a database or a look-up table having the tag as input value, such that the parameter values associated with a certain tag may conveniently be retrieved.

Action 503—A second set of parameter values and an associated second tag are received from the base station 110. According to some embodiments, the parameter value, or values, which value, or values, differ from the received first set of parameter values may be received.

Thereby may redundant signalling and data processing be avoided or reduced, as the same parameter value may not be transmitted twice, if the values are the same in both the first set of parameter values and the second set of parameter values.

Sometimes, the difference between the first set of parameter values and the second set of parameter values is very small, for example only a small part of the parameter values are changed at the time.

An illustrating non-limiting example is now discussed. Assume the parameters: "first parameter"={1,2,3,4}, "second parameter"={1,2,4}, "third parameter"={1,2,3}, "fourth parameter"={q, r}.

The first set A may comprise first parameter=1, second parameter=2, third parameter=1. The second set B may comprise first parameter=1, second parameter=2, third parameter=3, fourth parameter=r. In such scenario, then action 503 is to be performed, the third parameter=3 and the fourth parameter=r may be transmitted as comprised in the second set B, i.e. the values of the second set, which are different from the first set of parameter values.

Thereby, by only communicating the difference between the values of first set of parameters and the second set, may communication resources be saved.

Action 504—The received second set of parameter values and the associated second tag are stored. The second set of parameter values and the associated second tag may be stored in a memory comprised within the user equipment 120, or readily accessible to the user equipment 120. The parameter values and the associated second tag may be stored e.g. in a database or a look-up table having the tag as input value, such that the parameter values associated with a certain tag may conveniently be retrieved.

Action 505—This action may be performed within some alternative embodiments. A configuration message may be received from the base station 110. The configuration message may comprise information on how to interpret at least one code point in a set of bits, broadcasted in MIB.

The configuration message may be a broadcasted system information message, or a dedicated signalling message.

Action 506—A command for setting the values of system parameters is received from the base station 110, which command comprises a command tag. The command comprising the command tag, received from the base station 110 may be comprised in one of: a System Information Block (SIB), a Master Information Block (MIB), a paging message, a Medium Access Control (MAC) control message, a Radio Resource Control (RRC) control message, or a message on a Physical Downlink Control Channel (PDCCH).

The user equipment 120 may receive, from the base station 110, information on how and how often the user equipment 120 may receive, or read the command tag. This may be for example every 40 millisecond, every 80 millisecond or every 240 millisecond, just to mention some arbitrary and non-limiting examples. Further, such information may comprise e.g. how to utilize non-reserved bits and/or code points, or spares, in MIB. According to some embodiments may the command tag be comprised in such a non-reserved bit of MIB transmitted to be received by the user equipment 120.

Action 507—This action may be performed within some alternative embodiments. The command tag may be extracted from the set of bits in MIB, which may have been received from the base station 110 in action 505, according to the information comprised in the configuration message.

Action 508—This action may be performed within some alternative embodiments. The received command tag may be compared with the stored first and/or second tag. The comparison may be performed by parsing the command tag against the tags stored in the memory unit of the user equipment 120.

Action 509—The user equipment 120 applies the first set of parameter values associated with the stored first tag, if the stored first tag corresponds to the received command tag. If the stored second tag corresponds to the received command tag, the user equipment 120 applies the second set of parameter values associated with the stored second tag. The set of parameter values associated with the tag that corresponds to, e.g. is at least partly identical with the received command tag, may thus be applied.

Before applying the parameter values, the application of the parameter values may be delayed for a period of time after the reception of the command comprising the command tag. The application of the parameter values may alternatively be delayed until a certain point in time, which has been communicated to the user equipment 120 e.g. comprised in the command tag or transmitted together with the command tag from the base station 110.

Thanks to embodiments of the present method, relevant parameter values of the system information may be changed swiftly and be adapted instantly for example when the load of the cell 130 varies, which render an improved performance within the system 100.

Thereby system information change may be performed more efficiently and dynamically within the wireless communication system 100.

Figure 6:
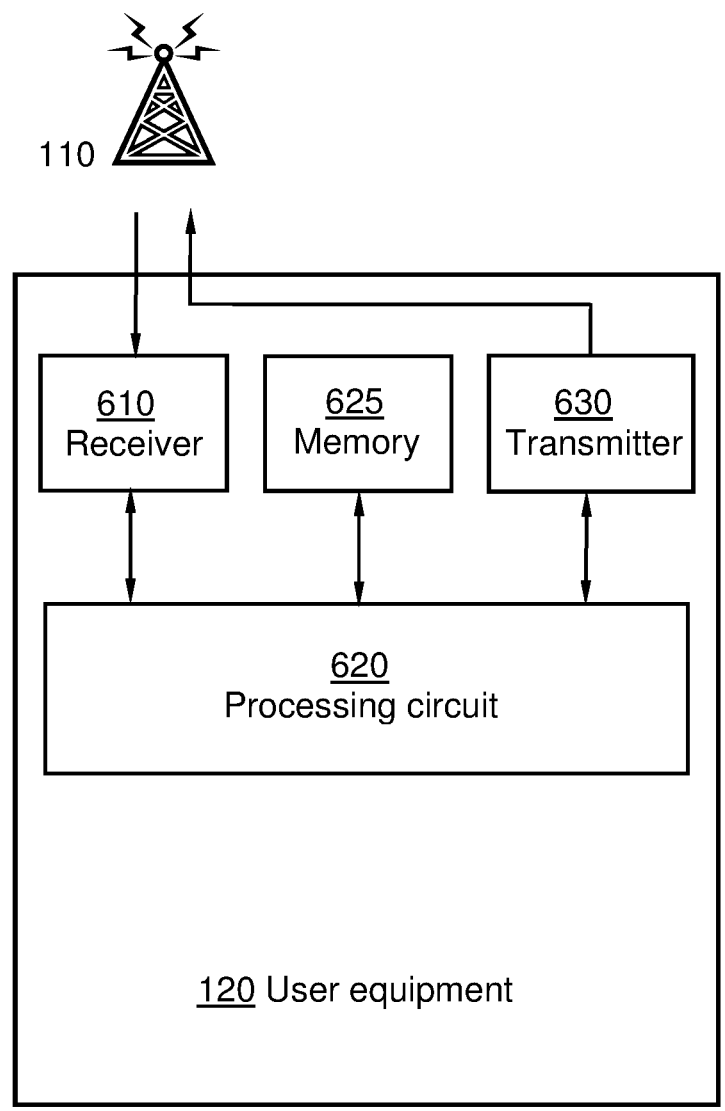
FIG. 6 is a schematic block diagram illustrating a user equipment according to some embodiments.

FIG. 6 schematically illustrates a user equipment 120. The user equipment 120 is configured to perform any, some or all of the previously described actions 501-509 in order to set values of system parameters used within a wireless communication system 100. The user equipment 120 and a base station 110 are comprised in the wireless communication system 100. The wireless communication network 100 may be e.g. an LTE radio network. The base station 110 may be e.g. an eNB according to some embodiments. The user equipment 120 may be mobile telephone or similar. The method may be performed within a cell 130, served by the base station 110.

In order to perform the actions 501-509 correctly, the user equipment 120 comprises a receiver 610. The receiver 610 is configured to receive a first set of parameter values and an associated first tag and a second set of parameter values and an associated second tag, from the base station 110. The receiver 610 is further configured to receive a command comprising a command tag from the base station 110. The user equipment 120 further comprises a memory 625. The memory 625 is configured to store the received sets of parameter values and the tag associated with each respective set.

The memory 625 may comprise e.g. a semiconductor storage such as Random-Access Memory (RAM), or Dynamic-RAM (DRAM). However, the memory 625 may refer to other forms of temporary or permanent storage. The memory 625 may comprise secondary storage devices such as e.g. hard disk drives, optical disc drives, and other similar data storage devices or flash memory, just to mention some examples.

The user equipment 120 in addition also comprises a processing circuit 620. The processing circuit 620 is configured to apply the first set of parameter values associated with the stored first tag if the stored first tag is corresponding to the received command tag, or applying the second set of parameter values associated with the stored second tag if the stored second tag is corresponding to the received command tag.

The processing circuit 620 may be represented by e.g. a Central Processing Unit (CPU), a microprocessor, or other processing logic that may interpret and execute instructions. The processing circuit 620 may perform data processing functions for inputting, outputting, and processing of data comprising data buffering and device control functions, such as call processing control, user interface control, or the like.

The processing circuit 620 may further be configured to delay the application of the parameter values for a period of time after the reception of the command tag, according to some embodiments.

The receiver 610 may be further configured to receive the parameter values whose values differ from the received first set of parameter values.

The user equipment 120 and/or the receiver 610 comprised within the user equipment 120 may be further configured to receive the command comprising the command tag from the base station 110, comprised in one of: a System Information Block (SIB), a Master Information Block (MIB), a paging message, a Medium Access Control (MAC) control message, a Radio Resource Control (RRC) control message, or a message on a Physical Downlink Control Channel (PDCCH).

The receiver 610 may be further configured to receive a configuration message from the base station 110, comprising information on how to interpret at least one code point in a set of bits, broadcasted in MIB. Further, according to some embodiments, the processing circuit 620 may be further configured to extract the command tag from the set of bits in MIB received from the base station 110, according to the information in the configuration message.

The receiver 610 may be further configured to receive, from the base station 110, information on how and when the user equipment 120 may receive the command tag, according to some embodiments.

The configuration message may be one of a broadcasted system information message, or a dedicated signalling message according to some embodiments.

Further, according to some embodiments, the user equipment 120 may comprise a transmitter 630. The transmitter 630 may be configured to transmit signals to the base station 110 over a radio interface.

It is to be noted that any internal electronics of the user equipment 120, not completely necessary for understanding the present method according to actions 501-509 has been omitted from FIG. 6, for clarity reasons.

Further, it is to be noted that some of the described units 610-630 comprised within the user equipment 120 in the wireless communication system 100 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the user equipment 120, and/or the base station 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The actions 501-509 in the user equipment 120 may be implemented through one or more processing circuit 620 in the user equipment 120, together with computer program code for performing the functions of the present actions 501-509. Thus a computer program product, comprising instructions for performing the actions 501-509 in the user equipment 120 may perform those actions in order to set values of system parameters used within the wireless communication system 100, when the computer program product is loaded into the processing circuit 620.

The computer program product mentioned above may be provided for instance in the form of a data carrier carrying computer program code for performing the method actions according to the present method when being loaded into the processing circuit 620. The data carrier may be e.g. computer readable storage medium such as a hard disk, a CD ROM disc, a memory stick, an optical storage device, a magnetic storage device or any other appropriate medium such as a disk or tape that may hold machine readable data. The computer program code may furthermore be provided as program code on a server and downloaded to the user equipment 120 remotely over a wireless or wired connection.

Figure 7:
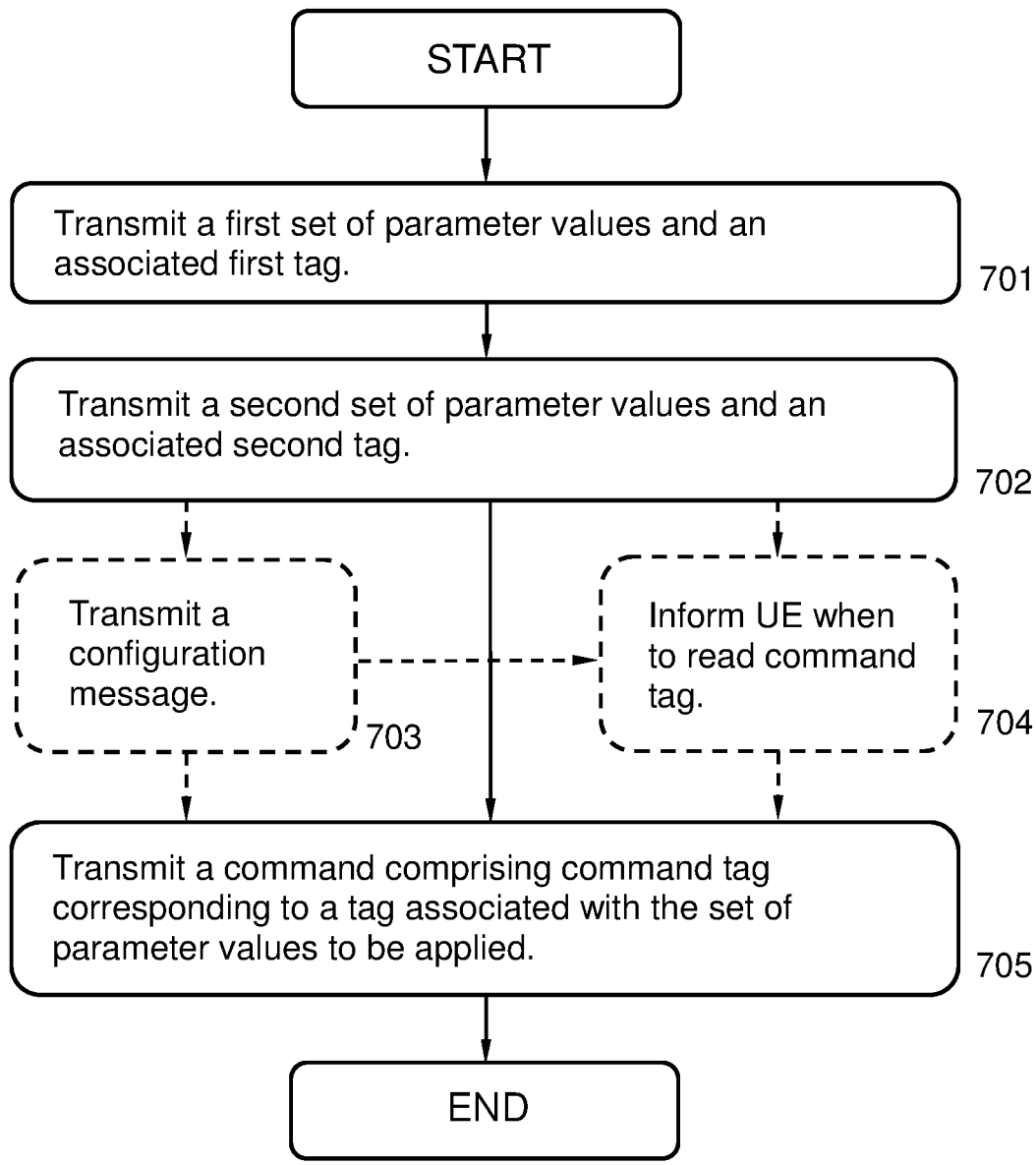
FIG. 7 is a flow chart illustrating an embodiment of the present method in a base station according to some embodiments.

FIG. 7 is a flow chart illustrating embodiments of method actions 701-705 in a base station 110. The actions 701-705 aims at setting values of system parameters used within a wireless communication system 100.

The user equipment 120 and a base station 110 are comprised in the wireless communication system 100. The wireless communication network 100 may be e.g. an LTE radio network. The base station 110 may be e.g. an eNB according to some embodiments. The user equipment 120 may be mobile telephone or similar. The method may be performed within a cell 130, served by the base station 110.

To appropriately set values of system parameters used within a wireless communication system 100, the method may comprise a number of actions 701-705.

It is however to be noted that some of the described method actions, e.g. action 701-705 may be performed in a somewhat different chronological order than the enumeration suggests and that some of them, e.g. action 701 and 702, may be performed simultaneously or in a rearranged chronological order. Further, some of the actions such as e.g. action 703 and/or 704 may be performed within some alternative. The method may comprise the following actions:

Action 701—A first set of parameter values and an associated first tag are transmitted. The first set of parameter values and the associated first tag may be transmitted to be received by the user equipment 120, or a subset of user equipments 120 within the cell 130.

Action 702—A second set of parameter values and an associated second tag are transmitted. The second set of parameter values and the associated second tag may be transmitted to be received by the user equipment 120, or a subset of user equipment 120 within the cell 130.

The second set of parameter values may comprise the parameter values whose values in the second set differ from the values of the parameters transmitted in the first set of parameter values, according to some embodiments.

Action 703—This action may be performed within some alternative embodiments. A configuration message may be transmitted. The configuration message may comprise information concerning how to interpret at least one code point in a set of bits transmitted in MIB.

Action 704—This action may be performed within some alternative embodiments. The user equipment 120 may be informed at which point in time to read the command tag. Further, the user equipment 120 may also be informed how to receive and/or read the command tag. Thus, the user equipment 120 may be informed that the command tag is to be received in one of: a System Information Block (SIB), a Master Information Block (MIB), a paging message, a Medium Access Control (MAC) control message, a Radio Resource Control (RRC) control message, or a message on a Physical Downlink Control Channel (PDCCH).

Action 705—A command comprising a command tag associated with the set of parameter values to be applied within the wireless communication system 100 is transmitted. The transmission of the command comprising the command tag may be performed to a subset of user equipment 120 situated within a cell 130 served by the base station 110.

The transmission of the command may according to some embodiments comprise a time or a time delay, indicating when the set of parameter values associated with a tag corresponding to the command tag is to be applied by the user equipment 120, after having received the command. Thus the application of the parameter values may be delayed for a period of time after the reception of the command comprising the command tag.

The command comprising the command tag may be comprised in one of: a System Information Block (SIB), a Master Information Block (MIB), a paging message, a Medium Access Control (MAC) control message, a Radio Resource Control (RRC) control message, or a message on a Physical Downlink Control Channel (PDCCH).

The transmission comprising the command tag may comprise a transmission of a set of bits in MIB comprising the command tag, according to the information in the configuration message.

Figure 8:
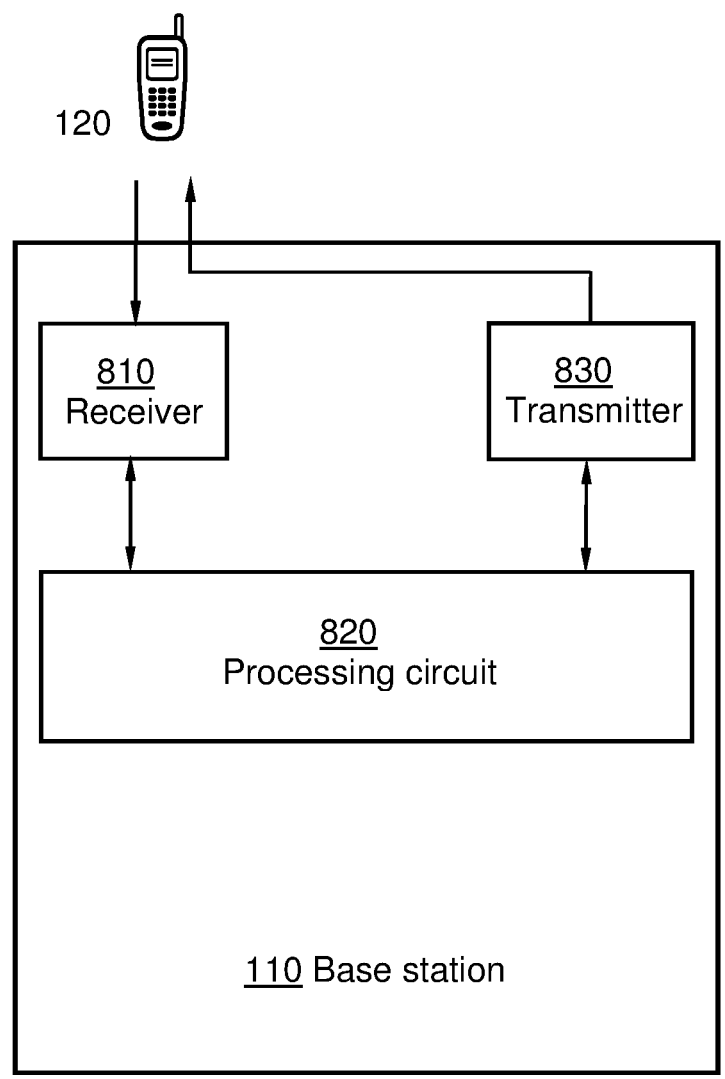
FIG. 8 is a schematic block diagram illustrating a base station according to some embodiments.

FIG. 8 schematically illustrates a base station 110. The base station 110 is configured to perform any, some or all of the actions 701-705, in order to set values of system parameters used within a wireless communication system 100.

The base station 110 and a user equipment 120 are comprised in the wireless communication system 100. The wireless communication network 100 may be e.g. an LTE radio network. The base station 110 may be e.g. an eNB according to some embodiments. The user equipment 120 may be mobile telephone or similar. The method may be performed within a cell 130, served by the base station 110.

In order to perform the actions 701-705 correctly, the base station 110 comprises e.g. a transmitter 830. The transmitter 830 is configured to transmit a set of parameter values, associated with a tag. Further, the transmitter 830 is also configured to transmit a command comprising a command tag associated with the set of parameter values to be applied within the wireless communication system 100.

The transmitter 830 may further be configured to transmit the command comprising the command tag to a subset of user equipment 120 in the cell 130. Such subset of user equipment 120 may be situated within a cell 130 served by the base station 110. The subset of user equipment 120 may comprise e.g. all user equipment 120 in idle mode, or all user equipment 120 in connected mode, just to mention some non-limiting examples.

Further, the transmitter 830 may also be configured to transmit the parameter values whose values in the second set differ from the values of the parameters transmitted in the first set.

The transmitter 830 may in addition also be configured to transmit a time or a time delay, indicating when the set of parameter values associated with a tag corresponding to the command tag is to be applied by the user equipment 120, after having received the command.

The command comprising the command tag to be transmitted by the transmitter 830 may be comprised in one of: a System Information Block (SIB), a Master Information Block (MIB), a paging message, a Medium Access Control (MAC) control message, a Radio Resource Control (RRC) control message, or a message on a Physical Downlink Control Channel (PDCCH), according to different embodiments.

The transmitter 830 may be further configured to transmit a configuration message, comprising information concerning how to interpret at least one code point in a set of bits transmitted in MIB, according to some embodiments. In addition, the transmitter 830 may be further configured to transmit a set of bits in MIB comprising the command tag, according to the information in the configuration message.

The transmitter 830 may further be configured to inform the user equipment 120 at which period in time to read the command tag, according to some embodiments.

The base station 110 may in addition comprise e.g. a receiver 810. The receiver 810 may be configured to receive signalling from user equipment 120.

Further, the base station 110 may further comprise a processing circuit 820 that may be configured to process or assist in processing at least some of the above described actions 701-705 in order to set values of system parameters utilized within a wireless communication system 100, according to some embodiments.

The processing circuit 820 may be represented by e.g. a Central Processing Unit (CPU), a microprocessor, or other processing logic that may interpret and execute instructions. The processing circuit 820 may perform data processing functions for inputting, outputting, and processing of data including data buffering and device control functions, such as call processing control, user interface control, or the like.

It is to be noted that any internal electronics of the base station 110, not completely necessary for understanding the present method according to actions 701-705 have been omitted from FIG. 8, for clarity reasons.

Further, it is to be noted that some of the described units 810-830 comprised within the base station 110 in the wireless communication system 100 are to be regarded as separate logical entities but not with necessity separate physical entities.

The actions 701-705 in the base station 110 may be implemented through one or more processing circuits 820 in the base station 110, together with computer program code for performing the functions of the present actions 701-705. Thus, a computer program product, comprising instructions for performing the actions 701-705 in the base station 110 may perform those actions in order to set values of system parameters used within a wireless communication system 100, when the computer program product is loaded into the processing circuit 820.

The computer program product mentioned above may be provided for instance in the form of a data carrier carrying computer program code for performing the method actions according to the present method when being loaded into the processing circuit 820. The data carrier may be e.g. computer readable storage medium such as a hard disk, a CD ROM disc, a memory stick, a flash memory, an optical storage device, a magnetic storage device or any other appropriate medium such as a disk or tape that may hold machine readable data. The computer program code may furthermore be provided as program code on a server and downloaded to the base station 110 remotely, e.g. over an Internet or an intranet connection.

When using the formulation "comprise" or "comprising" it is to be interpreted as non-limiting, i.e. meaning "consist at least of". The present methods and nodes are not limited to the above described embodiments. Various alternatives, modifications and equivalents may be applied. Therefore, the above embodiments are not to be taken as limiting the scope of claimed protection, which instead is to be defined by the appending claims.

What is claimed is:

1. A method in a user equipment, for applying a value of a system parameter used in a cell served by a network node of a wireless communication system, the method comprising:
   receiving multiple different values of the system parameter from the network node, each value being associated with a distinct tag;
   storing the multiple different values and the associated tags;
   receiving, from the network node, information on when to receive an indication of a value of the system parameter to apply in the cell;
   receiving from the network node, in accordance with the received information on when to receive the indication, the indication of the value of the system parameter to apply in the cell, the indication comprising a value tag associated with the value;
   applying one of the stored values of the system parameter when the tag associated with the stored value corresponds to the value tag of the indication.

2. The method of claim 1, wherein receiving the indication further comprises determining whether the indicated value of the system parameter is different from a value of the system parameter currently applied by the user equipment, and applying the indicated value only when determined to be different.

3. The method of claim 1, further comprising receiving information related to a time delay, wherein the one of the stored values is applied after the time delay counted from the time of receiving the indication.

4. The method of claim 1, wherein the indication is received in a System Information Block.

5. The method of claim 1, wherein the indication of the value of the system parameter is received periodically.

6. The method of claim 5, wherein a period for receiving the indication is configurable.

7. The method of claim 1, further comprising receiving a value of the system parameter from the network node when no stored value has an associated tag corresponds to the value tag of the indication.

8. A user equipment, configured to apply a value of a system parameter used in a cell served by a network node of a wireless communication system, the user equipment comprising:
   a receiver circuit;
   a transmitter circuit;
   a processing circuit operatively coupled to the receiver circuit and the transmitter circuit; and
   a memory operatively coupled to the processing circuit;
   wherein the processing circuit is configured to:
   receive multiple different values of the system parameter from the network node, via the receiver circuit, each value being associated with a distinct tag,
   store, in the memory, the multiple different values and the associated tags;
   receive from the network node, via the receiver, information on when to receive an indication of a value of the system parameter to apply in the cell;
   receive from the network node, in accordance with the received information on when to receive the indication, the indication of the value of the system parameter to apply, the indication comprising a value tag associated with the value;
   apply one of the stored values of the system parameter when the tag associated with the stored value corresponds to the value tag of the indication.

9. A method in a network node of a wireless communication system, for indicating a value of a system parameter used in a cell served by the network node, the method comprising:
   transmitting multiple different values of the system parameter to a user equipment in the cell, each value being associated with a distinct tag;
   transmitting information on when the user equipment is to receive an indication of a value of the system parameter to apply in the cell; and transmitting, in accordance with the transmitted information, the indication of the value of the system parameter to apply in the cell, the indication comprising a value tag associated with the value.

10. The method of claim 9, further comprising transmitting information related to a time delay after which the indicated value is to be applied, counted from a reception time of the indication at the user equipment.

11. The method of claim 9, wherein the indication is transmitted in a System Information Block.

12. The method of claim 9, wherein the indication of the value of the system parameter to apply for performing random access in the cell is transmitted periodically.

13. The method of claim 12, wherein a period for transmitting the indication is configurable.

14. A network node configured for a wireless communication system, and for indicating a value of a system parameter used for performing random access in a cell served by the network node, the network node comprising:
- a transmitter circuit; and
- a processing circuit operatively coupled to the transmitter circuit and configured to use the transmitter circuit to:
- transmit multiple different values of the system parameter to a user equipment in the cell, each value being associated with a distinct tag;
- transmit information on when the user equipment is to receive an indication of a value of the system parameter to apply in the cell; and
- transmit, in accordance with the transmitted information, the indication of the value of the system parameter to apply in the cell, the indication comprising a value tag associated with the value.

\* \* \* \* \*